United States Patent Office.

RICHARD V. MATTISON, OF AMBLER, PENNSYLVANIA.

NON-HEAT-CONDUCTING COMPOSITION FOR COVERING BOILERS, &c.

SPECIFICATION forming part of Letters Patent No. 492,093, dated February 21, 1893.

Application filed October 26, 1892. Serial No. 450,071. (No specimens.)

*To all whom it may concern:*

Be it known that I, RICHARD V. MATTISON, a citizen of the United States, residing at Ambler, county of Montgomery, and State of Pennsylvania, have invented a new and useful Improvement in Non-Heat-Conducting Compositions for Covering Boilers, Steam-Pipes, &c., of which the following is a full, clear, and exact description.

My invention has for its object to produce a non-heat-conducting composition for covering pipes, boilers &c. I accomplish this in the following manner—I take of carbonate of magnesium ten parts by weight, plaster of paris sixty parts by weight, asbestus ten parts by weight and wood pulp twenty parts by weight. I find the above proportions give good results, but they may be varied considerably and still produce good results. These materials are mixed together in a pasty state with water in a pug-mill or in a similar mixer, for covering boilers or pipes and then dried. When applied to pipes or boilers they are covered by the usual canvas covering.

Having now fully described my invention, what I claim, and desire to protect by Letters Patent, is—

A non-heat-conducting compound composed of carbonate magnesium, plaster paris, asbestus and wood pulp, as above described.

In testimony of which invention I have hereunto set my hand.

RICHARD V. MATTISON.

Witnesses:
GEO. W. REED,
FRANK S. BUSSER.